United States Patent
Castelli et al.

(10) Patent No.: US 9,868,539 B2
(45) Date of Patent: Jan. 16, 2018

(54) AIRCRAFT ENGINE PYLON TO WING MOUNTING ASSEMBLY

(71) Applicant: EMBRAER S.A., São José dos Campos, São Paulo (BR)

(72) Inventors: Alberto Dei Castelli, São Paulo (BR); Clovis Augusto Eça Ferreira, São Paulo (BR); Wanderley Montoro, São Paulo (BR); Aldemiro Lorenzini Filho, São Paulo (BR); Carlos Alberto Bones, Jr., São Paulo (BR); Juliano De Oliveira, São Paulo (BR)

(73) Assignee: EMBRAER S.A., São José dos Campos-SP (BR)

( * ) Notice: Subject to any disclaimer, the term of this patent is extended or adjusted under 35 U.S.C. 154(b) by 57 days.

(21) Appl. No.: 14/863,989

(22) Filed: Sep. 24, 2015

(65) Prior Publication Data
US 2017/0088279 A1  Mar. 30, 2017

(51) Int. Cl.
*B64D 27/26* (2006.01)
*B64D 27/18* (2006.01)
*B64D 25/00* (2006.01)

(52) U.S. Cl.
CPC ............. *B64D 27/26* (2013.01); *B64D 25/00* (2013.01); *B64D 27/18* (2013.01); *B64D 2027/264* (2013.01)

(58) Field of Classification Search
CPC ........ B64D 27/00; B64D 27/02; B64D 27/26; B64D 2027/262; B64D 2027/264; F02C 1/00
See application file for complete search history.

(56) References Cited

U.S. PATENT DOCUMENTS

| | | | | |
|---|---|---|---|---|
| 5,524,847 A * | 6/1996 | Brodell | ..................... | B64C 7/02 244/54 |
| 6,330,985 B1 * | 12/2001 | Manteiga | ............... | B64D 27/18 244/54 |
| 2005/0274485 A1 * | 12/2005 | Huggins | ................... | B22C 9/22 164/349 |
| 2007/0205324 A1 * | 9/2007 | Diochon | ................ | B64D 27/26 244/54 |
| 2009/0309005 A1 * | 12/2009 | Foster | .................... | B64D 27/26 248/554 |

(Continued)

FOREIGN PATENT DOCUMENTS

| CA | 2800464 A1 | 6/2013 | ............. F02C 3/107 |
|---|---|---|---|
| FR | 3025782 A1 * | 3/2016 | ............. B64D 27/26 |

*Primary Examiner* — Joseph W Sanderson
*Assistant Examiner* — Aaron M Rodziwicz
(74) *Attorney, Agent, or Firm* — Nixon & Vanderhye P.C.

(57) ABSTRACT

Pylon mounting assemblies are provided for mounting an engine (e.g., a turbojet engine) to a wing of an aircraft. The pylon mounting assemblies include an upper pylon connection member, and a lower pylon connection box. The upper pylon connection member and the lower pylon connection box respectively define opposed lower and upper mounting surfaces which establish a mounting plane that slopes downwardly and rearwardly relative to aircraft travel direction. At least one connector assembly connects the upper pylon connection member and a lower pylon connection box to one another at the opposed respective lower and upper mounting surfaces thereof.

9 Claims, 5 Drawing Sheets

(56) References Cited

U.S. PATENT DOCUMENTS

| | | | |
|---|---|---|---|
| 2010/0193627 A1* | 8/2010 | Lafont | B64D 27/18 244/54 |
| 2014/0191080 A1* | 7/2014 | Surply | B64C 7/02 244/54 |
| 2015/0013142 A1* | 1/2015 | West | B64D 27/18 29/525.08 |
| 2015/0048202 A1* | 2/2015 | Takeuchi | F02C 7/25 244/54 |
| 2015/0144732 A1* | 5/2015 | Peyruseigt | B64C 1/0009 244/54 |
| 2015/0336678 A1* | 11/2015 | Cassagne | B64D 27/26 244/54 |
| 2016/0368611 A1* | 12/2016 | Castelli | B64D 27/26 |

* cited by examiner

AIRCRAFT ENGINE PYLON TO WING MOUNTING ASSEMBLY

CROSS-REFERENCE TO RELATED APPLICATION

This application may be deemed related to copending and commonly owned U.S. application Ser. No. 14/863,941 filed on Sep. 24, 2015, the entire content of which is expressly incorporated hereinto by reference.

FIELD

The embodiments disclosed herein relate generally to assemblies to attach an aircraft engine (e.g., a turbojet engine) to the underside of an aircraft wing by way of an engine mounting pylon.

BACKGROUND

In order to achieve design goals related to reduction of fuel consumption with its associated advantages of thereby reducing emissions of air pollutants and noise, there is a trend in the commercial aviation industry towards the adoption of turbojet engines having improved design criteria. These new generation turbojet (turbofan) engines are however larger and thus heavier than the existing engine models. On the other hand, newly designed wings are being proposed to match the new generation engines with the ultimate goal of achieving further fuel savings, i.e., wings that sustain lower induced drag due to a larger aspect ratio. These new larger aspect ratio wings however exhibit a characteristic that leads to smaller cross sections with reduced stiffness. Both of these factors contribute to the aeroelastic requirements becoming more critical than for the existing generation of commercial jets.

Taking into account the relatively larger weight and size of the new generation of turbojet engines and the fact that they will be installed under the newly designed wings with larger aspect ratio and thus smaller cross sections, the aeroelastic viability thereby becomes highly dependent on the design of the attachment assemblies to attach the engine mounting pylon to the underside of the wing. The existing solutions for the pylon-to-wing attachment cannot provide an appropriate stiffness for the new mass and geometric characteristics of the newer generation of larger turbojet engines that will readily satisfy flutter certification requirements, particularly when the engine pitch mechanisms are critical to ensure proper engine operation.

Thus, if current pylon-to-wing attachment assemblies are to be adopted for the new generation of turbojet engines, it will become necessary to either increase the structural weight of the wing box or change the wing box construction materials (e.g., from traditional metallic alloys to stiffer and more expensive alternatives such as composite systems).

Therefore, what is needed in this art are turbojet engine pylon-to-wing mounting assemblies that will provide sufficient stiffness requirements to accommodate both the new generation of heavier turbojet engines and the larger aspect ratio (smaller cross-section) aircraft wings. It is towards providing such a solution that the embodiments of the invention disclosed herein are directed.

SUMMARY

According to the embodiments disclosed herein, pylon mounting assemblies are provided for mounting an engine to a wing of an aircraft which include an upper pylon connection member, and a lower pylon connection box, wherein the upper pylon connection member and the lower pylon connection box respectively define opposed lower and upper mounting surfaces which establish a mounting plane that slopes downwardly and rearwardly relative to aircraft travel direction. At least one connector assembly connects the upper pylon connection member and a lower pylon connection box to one another at the opposed respective lower and upper mounting surfaces thereof.

In some embodiments, the upper pylon connection member extends forwardly of the wing box of the aircraft wing. Alternatively or additionally, the upper pylon connection member includes an upper surface which is an extension of an upper surface of the aircraft wing. The lower pylon connection box may be embodied so as to define a substantially horizontal surface forwardly of the upper mounting surface thereof.

The one or connector assemblies may frangibly connect the upper pylon connection member and the lower pylon connection box so as to allow separation of the lower pylon connection box from the upper pylon connection member in response to a separatory load in excess of a nominal design load (thereby meeting crashworthiness certification requirements). These frangible connections between the upper pylon connection member and the lower pylon connection box may include an aligned series of opposed pairs of mounting blocks associated with the upper pylon connection member and the lower pylon connection box, and connectors interconnecting the opposed pairs of mounting blocks.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
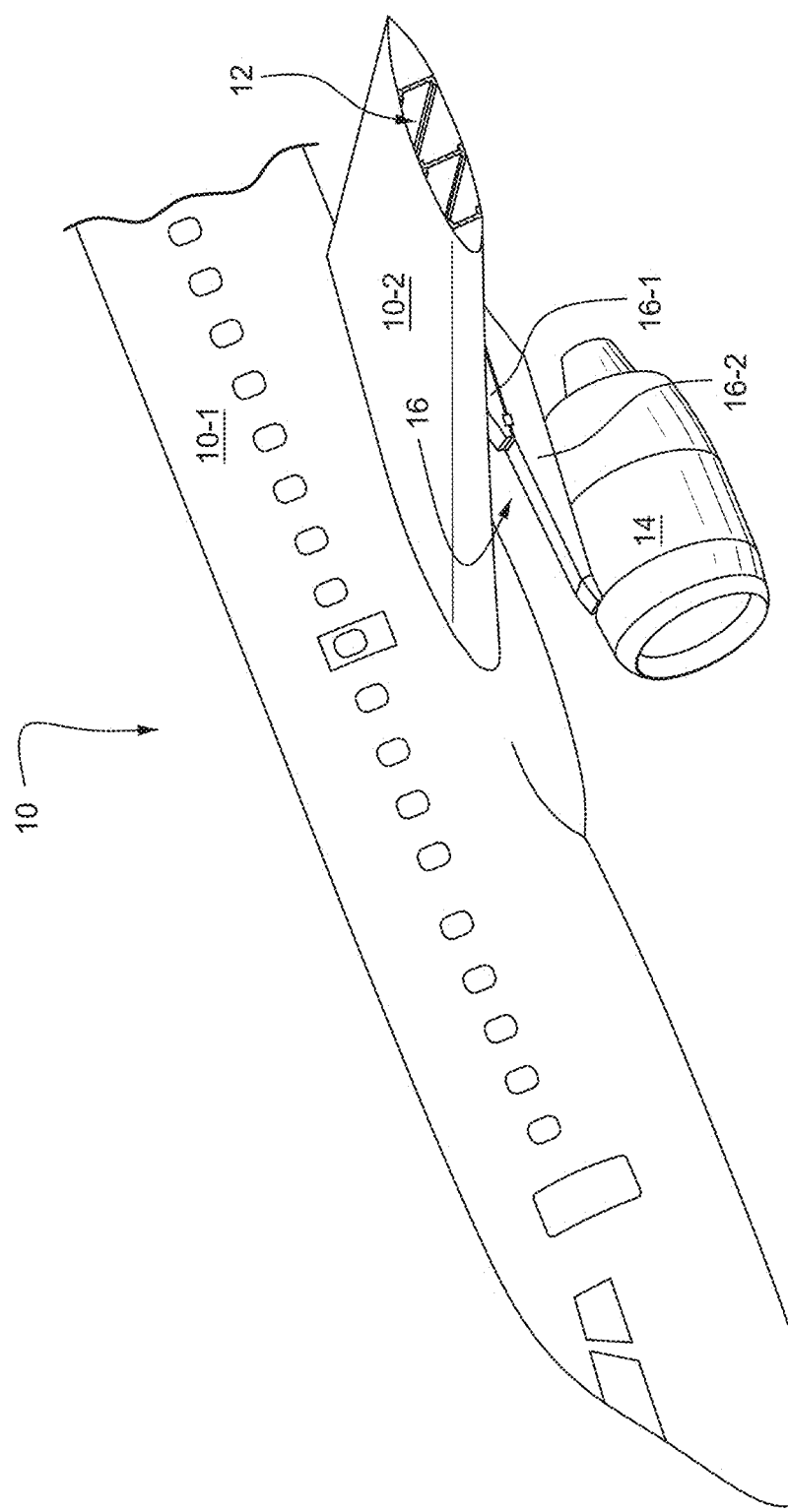
FIG. 1 is a front perspective bottom view of a typical aircraft engine and its associated mounting pylon according to an embodiment of the invention for mounting the engine to the aircraft's wing box structure.
Figure 2:
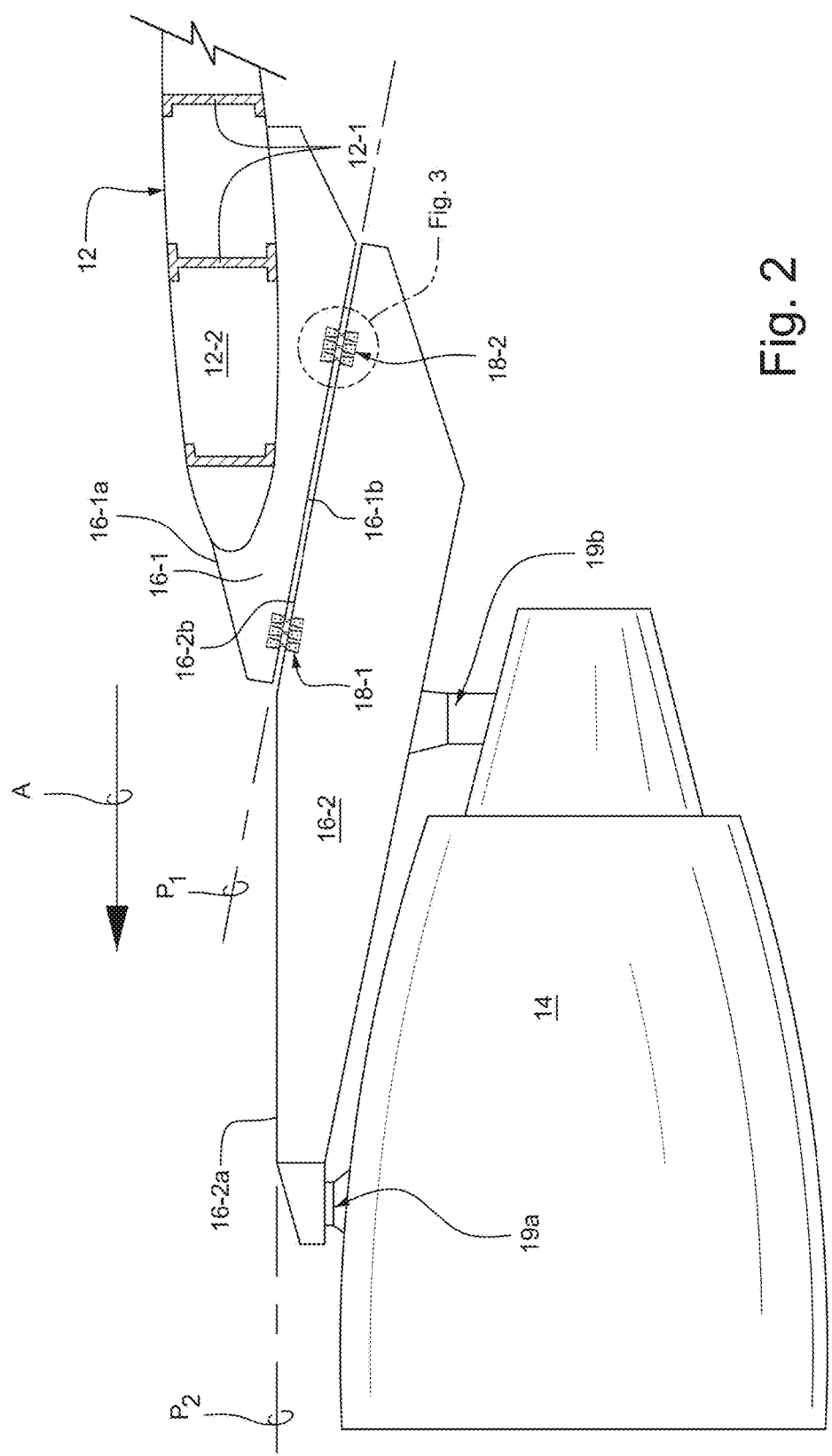
FIG. 2 is an enlarged side elevational view of the aircraft engine wing-mounting pylon depicted in FIG. 1.

Accompanying FIG. 1 depicts generally an aircraft 10 having a fuselage 10-1 and an exemplary wing 10-2 which is defined by a structural wing box 12 formed of wing spars 12-1 extending outwardly from the fuselage 10-1 and aerodynamically shaped rib elements 12-2 (see FIG. 2). An exemplary turbojet engine 14 is shown attached to the underside of the wing 10-2 by way of a pylon mounting assembly 16 according to the invention. It will of course be understood that only the port side wing 10-1 and port side engine 14 are shown in FIG. 1 but are exemplary to the starboard side wing and engine that are not depicted therein. Thus, the description which follows applies equally to both wings and engines of the aircraft 10.

FIG. 2 shows the mounting of the aircraft turbojet engine 14 to the wing box 12 of the aircraft wing 10-1 by way of the pylon mounting assembly 16 according to the invention in greater detail. As is shown, the pylon mounting assembly 16 is comprised of an upper pylon connection member 16-1 and a lower pylon box structure 16-2 connected to one another by forward and aft connector assemblies 18-1 and 18-2, respectively. The upper pylon connection member 16-1 is most preferably a solid structure (i.e., a solid mass of lightweight metal alloy) attached rigidly to and extending forwardly of the wing box 12 relative to the aircraft's travel direction (noted by arrow A in FIG. 2). The lower pylon box structure is however preferably formed of interconnected lattice structure of individual longitudinal and latitudinal support members (not shown). In the interests of improved aerodynamics, both the upper pylon connection member 16-1 and the lower pylon box structure 16-2 may be covered by a suitable skin structure (not shown), e.g., aluminum alloy sheet.

The upper pylon connection member 16-1 defines an upper surface 16-1a and a lower mounting surface 16-1b which defines a plane P1 sloping downwardly and rearwardly relative to the aircraft's direction of travel (arrow A). The upper mounting surface 16-1a is essentially a forward extension of the top surface of the aircraft wing 10-1.

The lower pylon box structure 16-2 includes a substantially planar forward surface 16-2a defining a substantially horizontal plane P2 and a mounting surface 16-2b rearwardly thereof which is parallel to the downwardly and rearwardly sloping plane P2. The engine 14 is dependently connected to the bottom of the lower pylon box structure 16-2 by means of conventional forward and aft engine mounting devices 19a, 19b, respectively.

Figure 3:
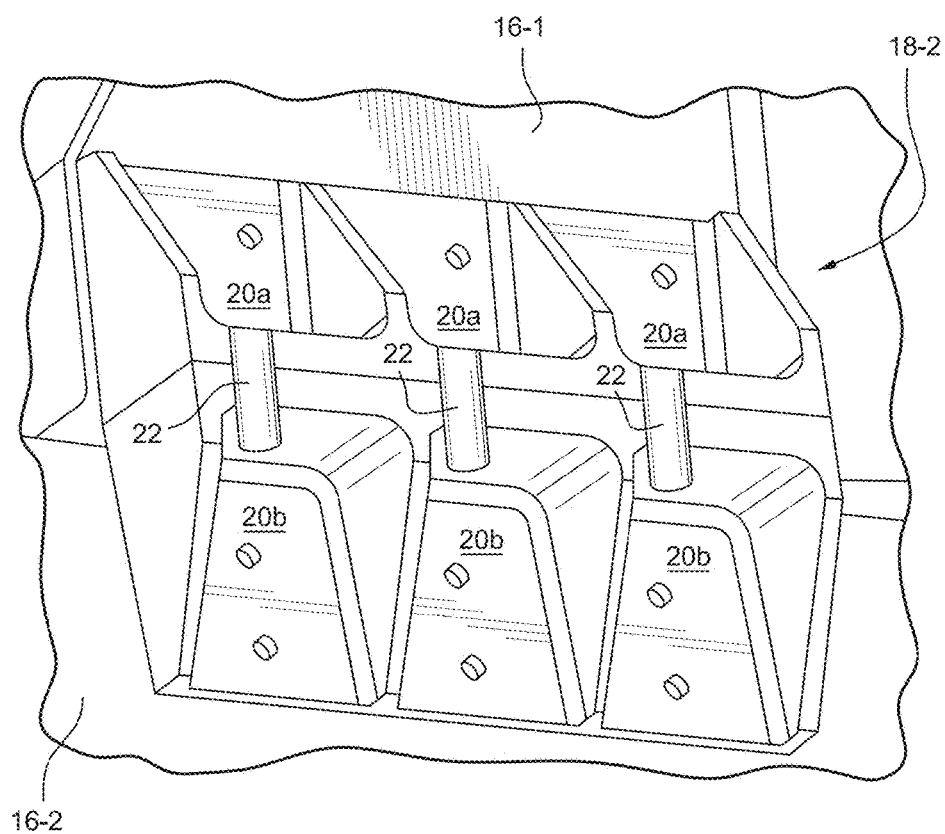
FIG. 3 is an enlarged perspective view of interconnected mounts of the engine wing mounting pylon assembly.

The aft connector assembly 18-2 is depicted in FIG. 3, it being understood that the description which follows is likewise applicable to the structures associated with the forward connector assembly 18-1. As is shown, the connector assembly 18-2 includes a series of aligned opposed pairs of mounting blocks 20a, 20b associated with the upper pylon connection member 16-1 and the lower pylon box structure 16-2, respectively. The mounting blocks 20a, 20b are in turn connected together by suitable connectors 22 (e.g., bolts, pins, rods and the like).

Figure 4:
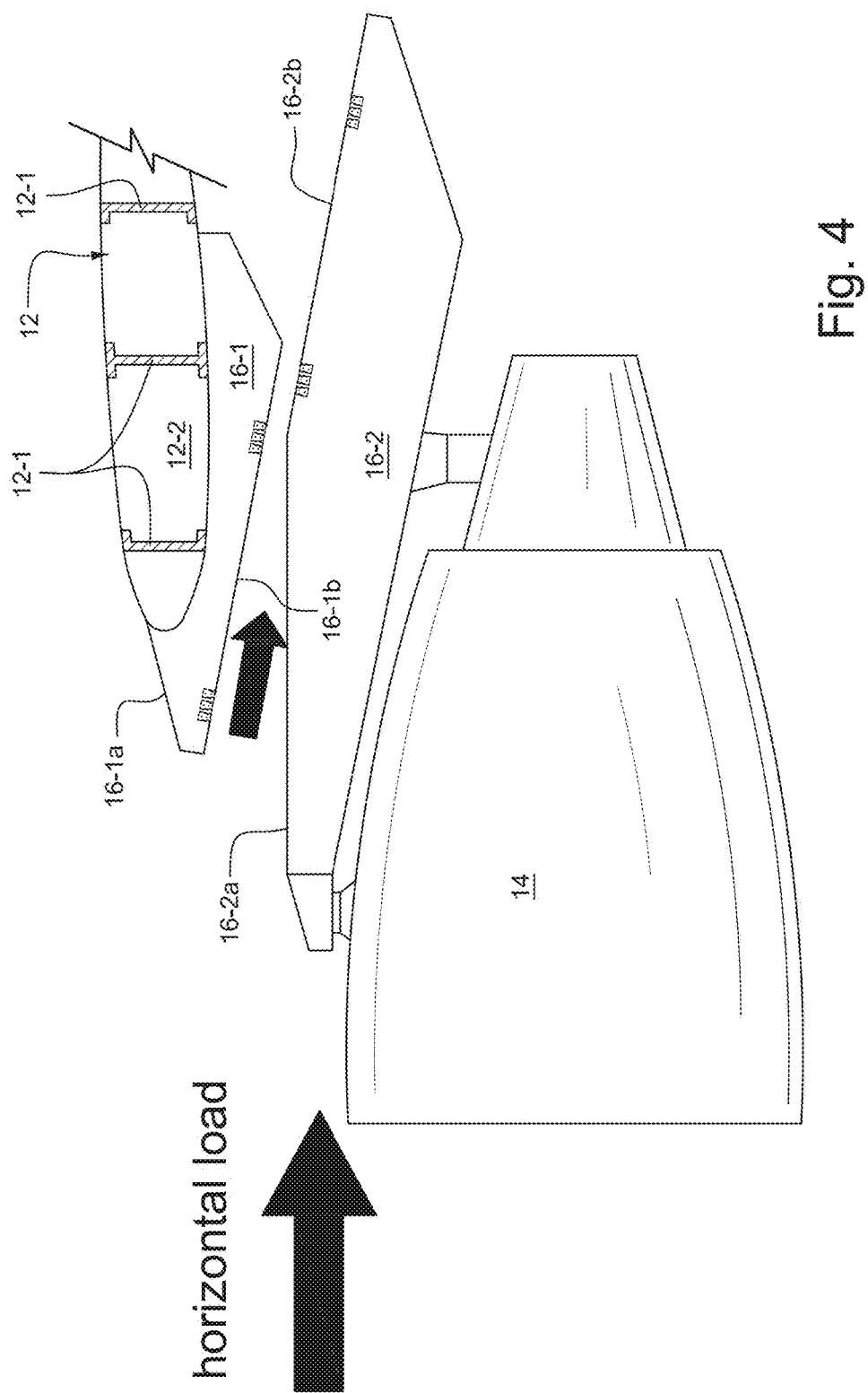
FIGS. 4 and 5 are schematic views showing engine separation scenarios associated with horizontal and vertical loads, respectively, for meeting crashworthiness requirements.
Figure 5:
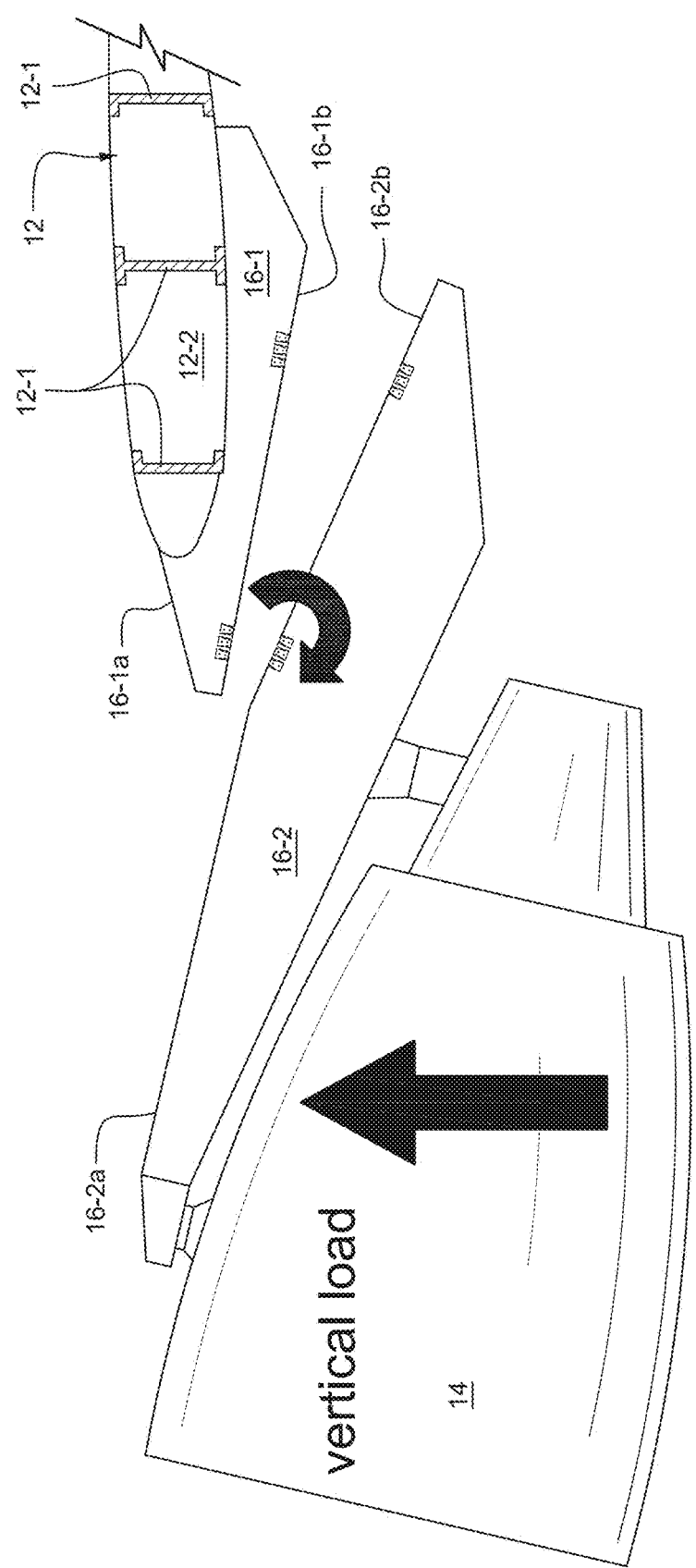

The mounting blocks 20a, 20b and connectors 22 are designed to provide a frangible coupling between the upper pylon connection member 16-1 and the lower pylon box structure 16-2 along the mounting plane P1 in the event of horizontal loads (FIG. 4) and upwardly vertical loads (FIG. 5) in excess of nominal design loads being encountered. Thus, as is schematically depicted in FIGS. 4 and 5 the engine 14 may be separated from the wing 10-1 in response to encountering a separatory horizontal load (FIG. 4) and a separatory upward vertical load (FIG. 5) in order to meet crashworthiness requirements of certification.

The structural arrangement of the upper pylon connection member 16-1 and the lower pylon box structure 16-2 provides an assembly for attaching the turbojet engine 14 to the wing box 12 with improved stiffness. As such, the turbojet engine 14 may be of the newer generation of engines having a heavier weight while the wing box 12 may provide a wing 10-2 of higher aspect ratio without an excessive increase in the overall structural weight. By adopting the embodiment of the invention as described above, countermeasures such as providing flutter mass at the wing tip, structural sizing based on stiffness, or an expensive material change for the wing box (e.g. from metallic to composite) may be avoided.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. An aircraft wing assembly comprising an aircraft wing and a pylon mounting assembly for mounting an engine to the aircraft wing, wherein the pylon mounting assembly comprises:
    an upper pylon connection member, and
    a lower pylon connection box, wherein
    the upper pylon connection member and the lower pylon connection box respectively define opposed lower and upper mounting surfaces which establish a mounting plane that slopes downwardly and rearwardly relative to aircraft travel direction; and
    at least one connector assembly frangibly connecting the upper pylon connection member and the lower pylon connection box to one another at the opposed respective lower and upper mounting surfaces thereof so as to allow separation of the lower pylon connection box from the upper pylon connection member in response to a separatory load in excess of a nominal design load.

2. The aircraft wing assembly as in claim 1, wherein the upper pylon connection member is a solid structure connected rigidly to a wing box of the aircraft wing.

3. The aircraft wing assembly as in claim 2, wherein the upper pylon connection member extends forwardly of the wing box of the aircraft wing.

4. The aircraft wing assembly as in claim 3, wherein the upper pylon connection member includes an upper surface which is an extension of an upper surface of the aircraft wing.

5. The aircraft wing assembly as in claim 1, wherein the lower pylon connection box defines a substantially horizontal surface forwardly of the upper mounting surface thereof.

6. The aircraft wing assembly as in claim 1, wherein the pylon mounting assembly comprises forward and aft connector assemblies.

7. The aircraft wing assembly as in claim 6, wherein each of the forward and aft connector assemblies comprises an aligned series of opposed pairs of mounting blocks associated with the upper pylon connection member and the lower pylon connection box, and connectors interconnecting the opposed pairs of mounting blocks.

8. The aircraft wing assembly as in claim 1, wherein the at least one connector assembly comprises an aligned series of opposed pairs of mounting blocks associated with the upper pylon connection member and the lower pylon connection box, and connectors interconnecting the opposed pairs of mounting blocks.

9. An aircraft comprising the aircraft wing assembly as in claim 1.

* * * * *